United States Patent [19]

Kenworthy

[11] 4,449,909

[45] May 22, 1984

[54] DIE-CUT BRICK MACHINE FOR SPECIAL BRICK SHAPES

[75] Inventor: Samuel P. Kenworthy, Southern Pines, N.C.

[73] Assignee: Basic Machinery Co., Inc., Siler City, N.C.

[21] Appl. No.: 401,102

[22] Filed: Jul. 23, 1982

[51] Int. Cl.³ .............................................. B29C 17/14

[52] U.S. Cl. .................................... 425/296; 264/148; 425/301; 425/308; 425/314; 425/316

[58] Field of Search ............... 264/145, 146, 148, 157, 264/158; 425/296, 301, 308, 313, 314, 315, 316

[56] References Cited

U.S. PATENT DOCUMENTS

| | | | |
|---|---|---|---|
| 3,461,196 | 8/1969 | Bowles | 264/148 |
| 3,468,998 | 9/1969 | Lingl | 264/148 |
| 4,186,166 | 1/1980 | Hight | 264/145 |
| 4,311,073 | 1/1982 | Brugger et al. | 264/157 |

*Primary Examiner*—Donald E. Czaja
*Assistant Examiner*—Mary A. Becker
*Attorney, Agent, or Firm*—Pearne, Gordon, Sessions, McCoy, Granger & Tilberry

[57] ABSTRACT

A method and apparatus for producing die-cut brick is disclosed. The apparatus includes a cutter box in combination with a pusher which pushes elongated green clay slugs through the box. The box operates to cut a core extending lengthwise of the slug having the cross section of the desired brick. Guide means retain scrap completely around the core as it emerges from the die box and is moved in a stepwise fashion by the pusher to a cutoff device which cuts brick slices from the core. Because scrap is retained around the core, little or no distortion occurs during such slicing operation. The apparatus is arranged for quick and easy conversion from one shape to another.

9 Claims, 16 Drawing Figures

DIE-CUT BRICK MACHINE FOR SPECIAL BRICK SHAPES

BACKGROUND OF THE INVENTION

This invention relates generally to the manufacture of brick, and more particularly to a novel and improved apparatus for die cutting special brick shapes.

PRIOR ART

The manufacture of conventionally shaped brick is automatically accomplished with various types of brick setting machines. One such setting machine is illustrated in U.S. Pat. No. 3,589,495 to Pearne et al. In such setting machine, green clay is extruded as a column through a die. A slug cutter cuts the column into slugs, which are thereafter cut into individual brick and automatically set on a kiln car for drying and firing. Normally, such machines stack and/or face the slug before they are set on the kiln car. Such stacking or facing can occur before or after the slugs are cut into brick.

Setting machines virtually eliminate hand labor, produce a very uniform, high quality product, and function at very high production rates.

It is also sometimes required to produce specially shaped brick in relatively low quantities. Such brick are usually manually formed, often by measuring, marking, and hand-cutting. Such method of producing brick is very expensive, and often results in dimensional and quality variations which are undesirable.

SUMMARY OF THE INVENTION

This invention provides a machine which is capable of producing specially shaped die-cut brick of uniform high quality and with a minimum of manual labor.

Such machine automatically operates to advance an elongated slug, step by step through a die cutter box and a cutoff device. As the slug passes through the die cutter box, the core of the slug is cut to the desired shape, while the scrap remains positioned around such core. The cutoff device then cuts or slices finished pieces or brick off the slug. Because the scrap remains in place around the core during the cutoff, there is little or no distortion during cutoff, and a uniform, high quality product is obtained.

A pusher operates in timed relationship with the cutoff device, and advances the slug through a predetermined distance during each cycle so that the articles sliced from the core have the desired uniform thickness.

The predetermined distance through which the pusher operates during each cycle is easily adjusted, and the die cutter boxes are easily replaced so that the machine can be easily and quickly converted to produce a different specially shaped brick.

These and other aspects of the invention are more fully described in the following specification and illustrated in the attached drawings.

BRIEF DESCRIPTION OF THE DRAWINGS

FIGS. 7*a* through 7*e* are schematic, progressive views of the machine illustrating the operation thereof as it produces special cut brick or the like.

DETAILED DESCRIPTION OF THE DRAWINGS

Figure 1:
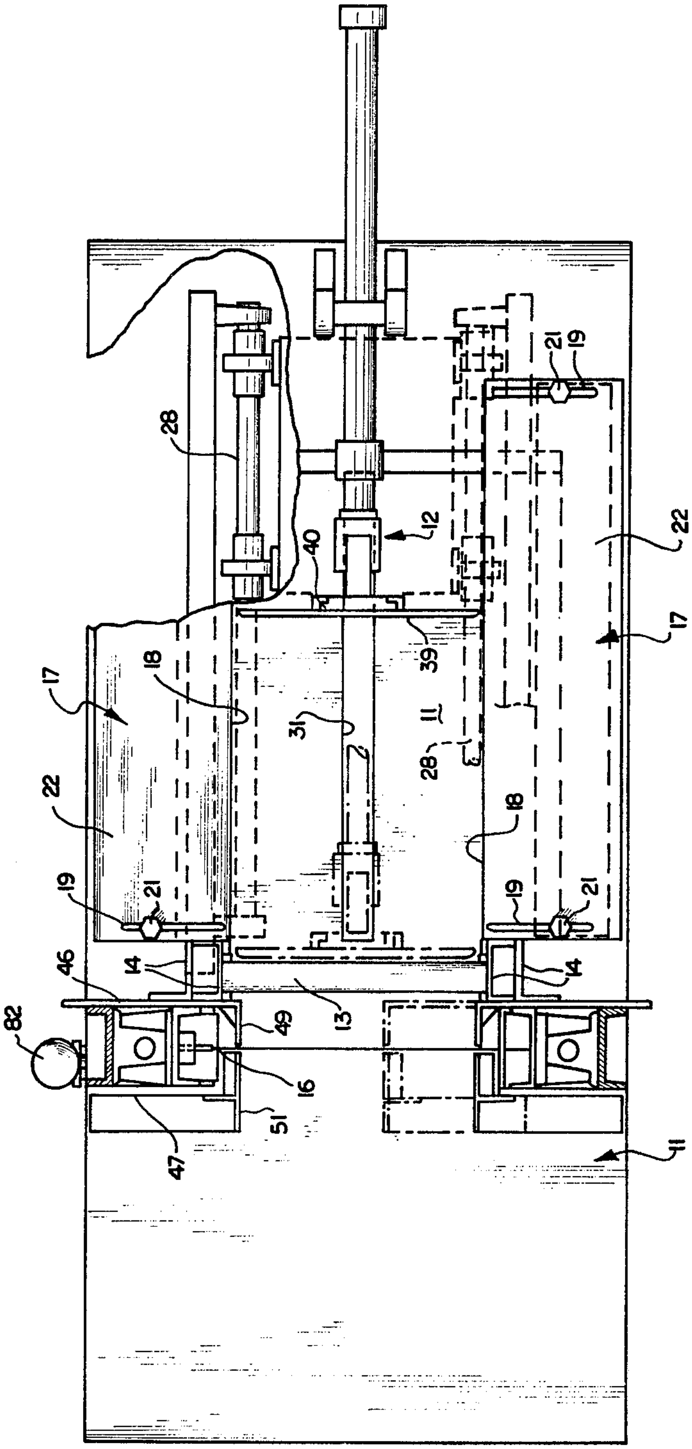
FIG. 1 is a plan view of the machine incorporating the present invention, with portions broken away to illustrate structural details.
Figure 2:
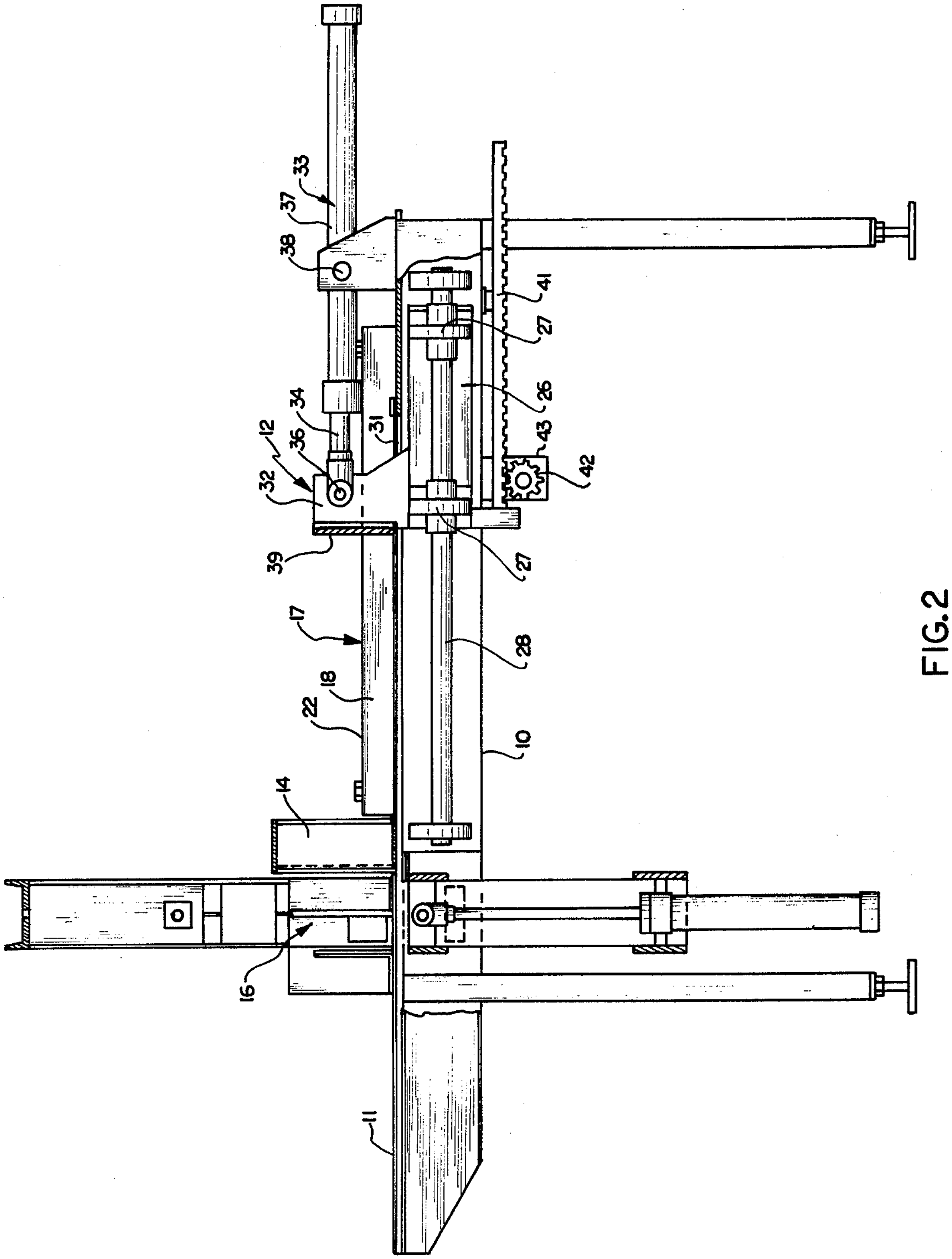
FIG. 2 is a side elevation of the machine illustrated in FIG. 1.
Figure 3:
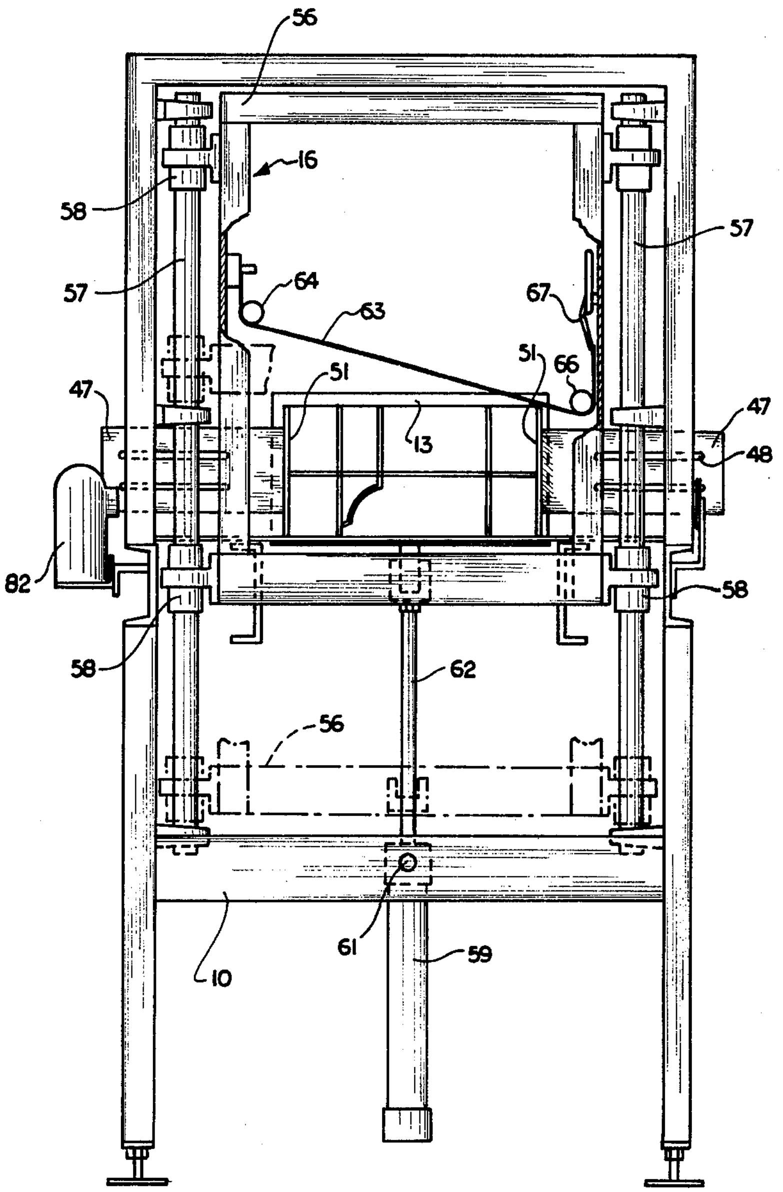
FIG. 3 is an end view taken generally along the output end of the machine but with portions removed for purposes of illustration.

Referring to FIGS. 1-3, a preferred embodiment incorporating the present invention includes a frame assembly 10. The frame assembly provides a support surface 11 along which the slug of clay is moved during operation of the machine. As viewed in FIGS. 1 and 2, a pusher system 12 is provided on the right end of the machine. To the left of the center of the machine, a die cutter box 13 is removably mounted between cutter box support frames 14 which extend vertically up from the support surface 11.

Again as viewed in FIGS. 1 and 2, a cutoff assembly 16 is mounted on the frame 10 to the left of the cutter box.

A pair of opposed and adjustable guide members 17 are mounted on the frame 10 and provide opposed, vertically extending guide surfaces 18 which are adjusted to closely receive the opposite sides of a slug being worked in the machine and operating to properly position a slug as it is moved through the machine. As best viewed in FIG. 1, the guide members 17 are provided with slots 19 through which lock bolts 21 extend. Adjustment of the guide members is provided by loosening the lock bolts so that the guide members can be moved to the proper adjusted position and then the lock bolts 21 are again tightened to lock the guide members in their adjusted position.

The guide members also provide upper surfaces 22 which are substantially parallel to the support surface 11 but are spaced somewhat above the support surfaces. These horizontal or upper surfaces 22 facilitate the positioning of a slug within the machine by allowing the operator to slide the slug over to a position between the surfaces 18. When such position is reached, the slug drops down onto the support surface 11 and is guided between the opposed surfaces 18.

The pusher assembly or system 12 includes a carriage 26 supported for horizontal movement by bearings 27 which are mounted for movement along parallel support rods 28. The support rods 28 are mounted on the frame 10 below the support surface 11 and support the carriage for lengthwise movement along the support surface. The support surface 11 is formed with a slot 31 through which a pusher column 32 extends from the carriage 26. A piston and cylinder actuator 33 is connected to reciprocate the column 33 and the carriage 26. Such actuator includes a piston 34 pivoted at 36 to the column 32 and a cylinder 37 pivoted at 38 to the frame 10.

Removable pusher plates 39 are mounted on the column 32 by a tongue and groove type structure illustrated at 40 in FIG. 1. Such structure provides a secure mounting for the pusher plate 39 but permits easy removal and reinstallation when plate replacement is required. A number of different plates 39 are provided with the machine so that a plate having a width substantially equal to the spacing between the guide surfaces 18 can be installed when the spacing between the guide surfaces is adjusted. Normally, the pusher plate 39 should have a width such that it extends almost all of the way between the two guide surfaces 18 to provide a full surface for pushing a slug.

Mounted on the carriage 26 is a gear rack 41 which meshes with a pinion gear 42 on a counter 43. The counter 43 is preferably of a type having a disc which is segmented into divisions equaling some predetermined amount of rotation and, in turn, through the rack and pinion drive some predetermined amount of movement of the pusher. For example, the disc may be selected to indicate movement of the pusher system 12 through a distance equal to 1/32 inch. The segments of the disc activate a standard sensor which counts the segments as the counter rotates, and therefore determines the distance through which the pusher is moved. It is to be understood that other forms of linear transducers may be utilized and that the details of the measuring system are not illustrated because they are well known to persons skilled in the art.

Positioned to the left of the die cutter box 13 as illustrated in FIGS. 1 and 2, the machine is provided with additional adjustable guides 46 and 47, which are again provided with slots 48 (illustrated in FIG. 3), so that the vertical guide faces 49 and 51, respectively, of the guides can be adjusted to a position in alignment with the guide surfaces 18 of the guide member 17.

The cutoff assembly 16 includes a vertically movable carriage 56 which is supported for vertical movement along fixed rods 57 by bearings 58, which slide along the rods and support the carriage for such vertical movement. Here again, a piston and cylinder actuator includes a cylinder 59 pivoted at 61 on the frame 10 and a piston 62 which is connected to raise and lower the carriage 56 between the full-line position or raised position illustrated in FIG. 3 and the lowered or operative position illustrated in phantom in FIG. 3.

In the illustrated embodiment, a cutoff wire 63 is mounted on the carriage 56 extending over rollers 64 and 66 and tensioned by a spring 67. Such wire functions to cut slices from the forward end of the slug in the manner described below.

FIGS. 4 and 5 illustrate various cutter boxes 13 which may be installed and used in the present machine. For example, FIG. 4*a* illustrates the cutter box 13, which is illustrated in FIG. 3 installed in the machine. Such cutter box operates to cut a slug having dimensions substantially as illustrated in FIG. 4 by dotted lines at 71. The slug is selected so that the core 72 cut from the slug is of a height less than the initial height of the slug and so that its width is less than the initial width of the slug. Consequently, scrap is provided at 73 all the way around the core. By providing excessive material in this manner, it is ensured that a full core having the proper shape required is provided. Further, the scrap is retained in position around the core 72 by the guide surfaces 49 and 51 as the cut slug emerges from the cutter box 13 and as the cut slug proceeds past the cutoff system 60. Because the scrap completely encloses the core, there is little or no distortion of the core as the cutter wire 63 is carried down through the slug to slice off the required pieces from the core to form the finished brick.

The cutter blades 74 are mounted within the cutter box to produce the required core shape. In the instance of the cutter box 13 illustrated in FIG. 4*a*, the cutter elements must be substantially rigid to provide the curved section at 76 and the sharp corners at the ends of such curve. Preferably, such cutter blades are formed as relatively flat metal strips which may be hollow-ground as illustrated at 77 in FIG. 5*a*, or chisel-pointed as indicated at 78 in FIG. 5*b*. Again, the cutter blades are mounted in the box so that they are sufficiently supported to remain in position as the slug is pushed through the cutter box.

Figure 5A:
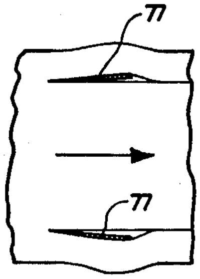
FIGS. 5*a* through 5*c* illustrate different forms of cutter elements which may be installed in typical cutter boxes of the type illustrated in FIGS. 4*a* through 4*d*.
Figure 5B:
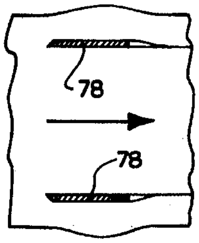
Figure 5C:
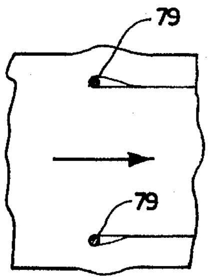

In some instances, cutter elements may be in the form of wire, as illustrated at 79 in FIG. 5*c*. The particular form of cutter blade or element will depend upon the shape which is required to be cut, upon the particular material being cut, and on the preference of the cutter box designer.

Figure 4A:
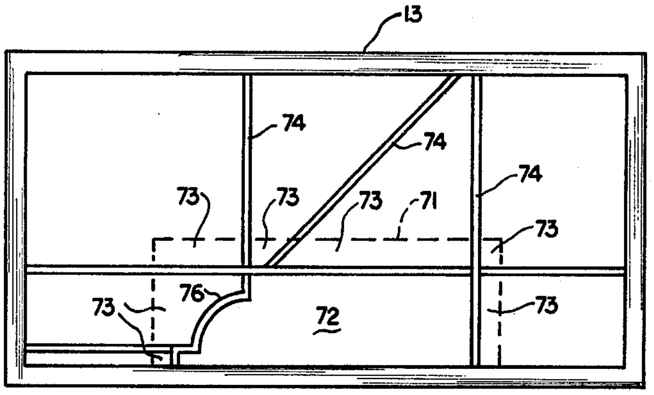
FIGS. 4*a* and 4*c* are illustrations of three typical cutter boxes which may be used in the machine in accordance with the present invention to produce three different special shapes.
Figure 4D:
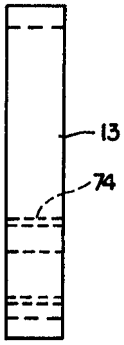
FIG. 4*d* is an end view of the cutter box illustrated in FIG. 4*a*.
Figure 4B:
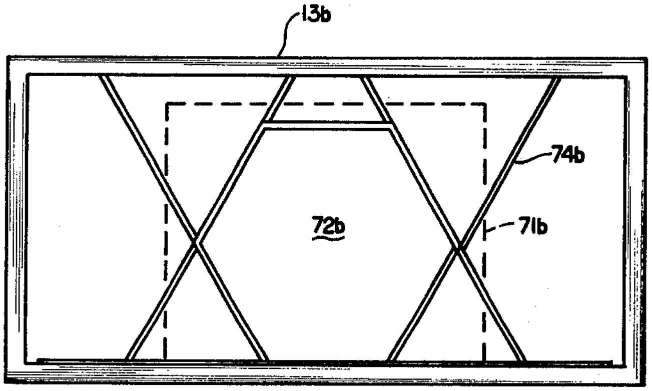

FIG. 4*b* illustrates a cutter box 13*b* for cutting hexagon-shaped brick. In this case, the cutter blades 74*b* are arranged to produce a hexagonal core 72*b*. In FIG. 4*b*, the cutter elements are illustrated as cutter blades. However, if desired, such shape can be cut by wire. Here again, the slug 73*b* must be sufficiently high to ensure that scrap is present above the core and sufficiently wide to ensure that scrap encloses the core on its sides. In this case, the slug is somewhat narrower than the slug 71 of FIG. 4*a*, but is substantially higher. In converting the machine to make the part associated with FIG. 4*b*, it would be merely necessary to remove the cutter box 13 and install the cutter box 13*b*. At the same time, the various side guides are adjusted to properly support the sides of the slug being used with the cutter box. Further, the pusher 39 is replaced by a pusher of the appropriate width. Additionally, if necessary, the stroke provided by the counter 43 is adjusted. With such relatively simple changes, which can be accomplished within a matter of minutes, the machine is converted from one shape to another.

Figure 4C:
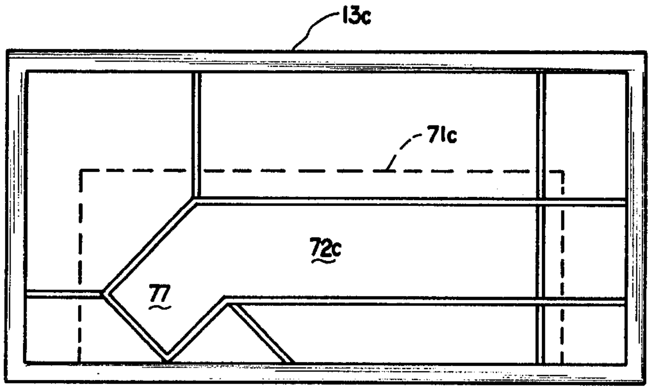

FIG. 4*c* illustrates still another cutter box 13*c* which operates to produce a core 72*c* having a diagonal nose 77 at one end. Here the cutter box is arranged to produce scrap virtually completely around the core 72*c* and the slug 71*c* is wider than either of the slugs in the previous two figures.

Figure 6:
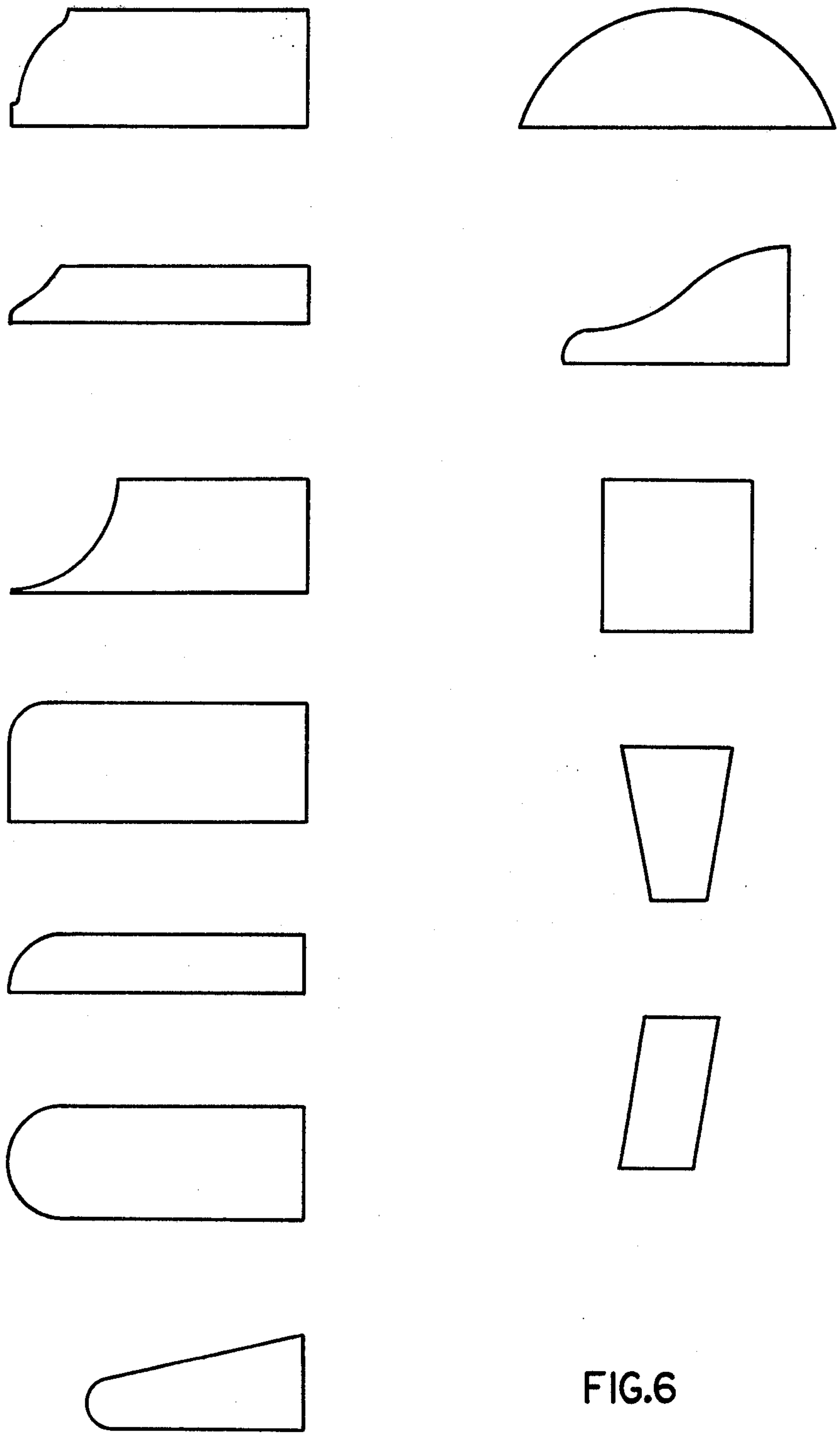
FIG. 6 illustrates a number of different special shapes which can be produced in a machine in accordance with this invention.
Figure 7A:
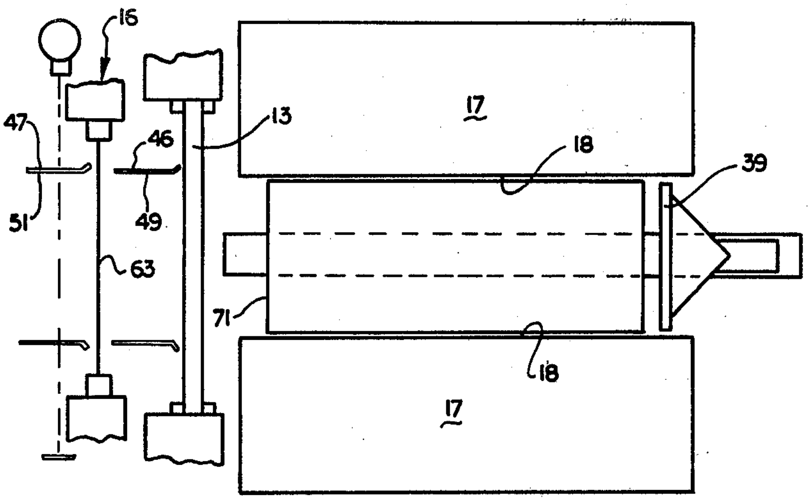
Figure 7B:
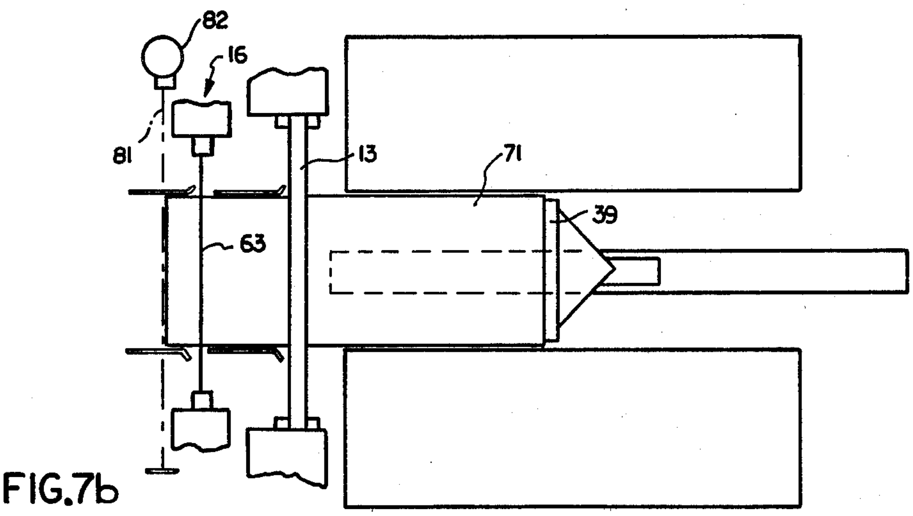
Figure 7C:
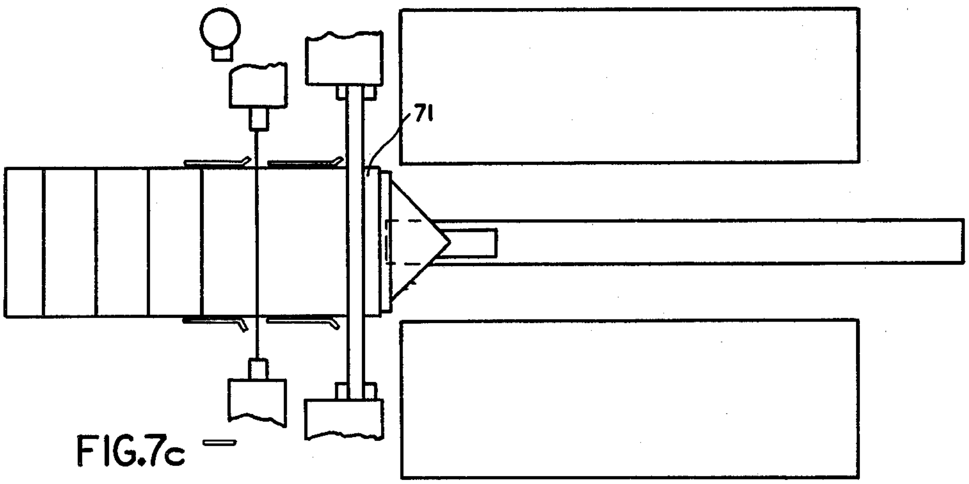
Figure 7D:
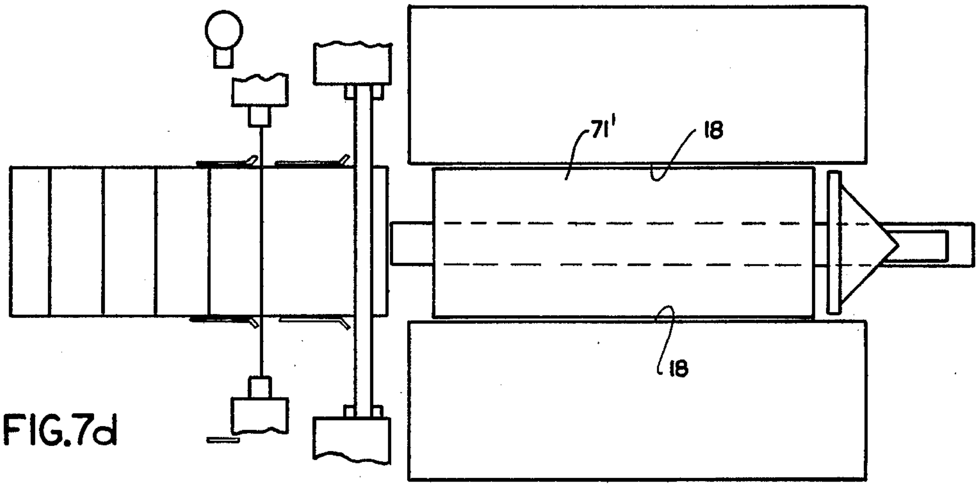
Figure 7E:
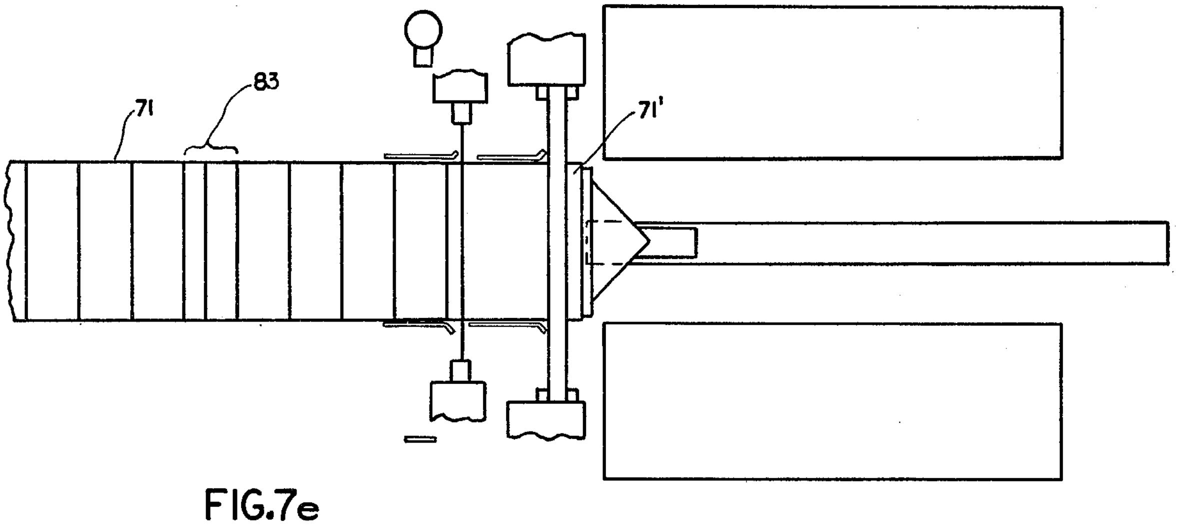

FIG. 6 illustrates additional shapes which can be produced on a machine incorporating the present invention. It should be understood, however, that FIGS. 4 and 6 are not intended to encompass all of the various shapes that can be produced, but merely provide an illustration of the versatility of a machine in accordance with the present invention. The shapes which can be produced are almost limitless, and depend solely on the ability of the cutter box designer to establish a cutting element system capable of producing the desired shape.

FIGS. 7*a* through 7*e* progressively and schematically illustrate the operation of the machine. After the required cutter box 13 is installed and the guides 17, 46, and 47 are adjusted to laterally guide and support a slug 71 of appropriate size, the slug 71 is positioned between the guide surfaces 18. This may be accomplished by sliding the slug over the upper surfaces of the guide member 17 until it is in a position to drop down between the surface 18. Any damage which might occur to the edge of the slug is not important because such surfaces are cut away and form part of the scrap. The pusher control counter 43 is then selected to provide for the stepwise advancement of the pusher through a distance equal to the desired thickness of the brick being formed. However, in the initial forward stroke, the counter is bypassed and the pusher operates continuously from the position of FIG. *7a* to the position of FIG. *7b*. Such stroke pushes the forward end of the slug 71 through the cutter box 13, where the core is formed, and past the wire 63 of the cutoff assembly 16.

When the forward end of the slug interrupts the beam 81 of a photocell sensor 82, the control system is operated to stop the pusher in the position of FIG. *7b* and to trigger the operation of the cutoff assembly 16 to cut away a layer of scrap from the forward end of the slug so as to square and finish the end of the slug. This ensures that the next slice will produce a desired, substantially perfectly formed brick.

After the first cut, the control system is operated automatically to advance the pusher a distance equal to the thickness of the desired brick. Such distance is set on the counter 43 by the machine operator during the set up of the machine. When the pusher is moved through the required distance, the control circuit automatically stops the pusher and the cutter is actuated. These alternate cycles of pusher operations followed by cutter operations continue until the pusher is advanced substantially its entire stroke, as illustrated in FIG. *7b*. The pusher is then retracted as illustrated in FIG. *7b*, and a subsequent slug 71' is installed between the surfaces 18 and the machine operation is again started and proceeds until the second slug 71' is processed.

It should be noted in FIG. *7e* that the forward end of the slug 71' operates to complete the movement of the slug 71 and that in most cases two pieces of scrap are produced, as shown at 83, which have a total thickness equal to the thickness of one brick. One piece of scrap is formed from the rearward end of the slug 71 and the other is formed from the forward end of the slug 71'. Once the slugs are cut, the scrap pieces are normally manually removed and the desired slices of the core are loaded on a kiln car for the usual drying and firing operations.

Although the present machine does involve some manual operation, it functions in virtually an automatic manner to feed and cut the slugs, and the amount of labor required for production is drastically decreased compared to the prior art procedures of manually cutting the brick. Further, the uniformity and quality of the finished product are greatly improved because each of the desired cut brick is formed in exactly the same manner as the other similar brick.

Although the preferred embodiment of this invention has been shown and described, it should be understood that various modifications and rearrangements of the parts may be resorted to without departing from the scope of the invention as disclosed and claimed herein.

What is claimed is:

1. An apparatus for producing special shaped die-cut brick comprising a frame providing a support surface for supporting an elongated green clay slug having a generally rectangular first cross section substantially perpendicular to the length of said slug, a cutting box operable to cut from said slug a core having a second cross section substantially perpendicular to the length of said slug smaller than said first cross section, said core extending lengthwise of a slug resting on said platform, said core having a cross section of the desired brick, power means operable to produce relative movement of said cutting box and said slug longitudinally with respect to said slug causing said core to be cut lengthwise of said slug, and cutoff means operable to slice laterally through said core along a plane substantially perpendicular to the length of said core and produce a plurality of bricks.

2. An apparatus as set forth in claim 1, wherein adjustable guide means retain scrap in position around said core while said cutoff means operates.

3. An apparatus as set forth in claim 2, wherein said cutting box is removably mounted on said frame and said power means is a pusher operable to move slugs along said support surface and past said cutting box with stepwise movement, said cutoff means operating while said slug is stationary.

4. An apparatus as set forth in claim 3, wherein said pusher is adjustable to change the length of said stepwise movement.

5. An apparatus as set forth in claim 2, wherein said guide means includes upper surfaces above said support surface along which slugs can be moved to a position between said guide means.

6. An apparatus as set forth in claim 1, wherein said cutting box includes relatively rigid, ribbonlike cutter elements supported to cut said core and produce scrap pieces enclosing the top and sides of said core.

7. An apparatus for forming special shaped cut brick from elongated green clay slugs, comprising a frame providing a support surface along which an elongated slug having a first cross-sectional shape and size substantially perpendicular to the length of said slug is longitudinally movable, a cutter box on said frame having cutter elements shaped to cut a longitudinal core from said slug to a required shape as said slug is pushed through said cutter box, said required shape having a second cross-sectional shape and size substantially perpendicular to the length of said core different from and smaller than said first cross-sectional shape and size, a cutoff device operable to laterally cut through said slug along a plane substantially perpendicular to the length of said core to produce a plurality of slices of said core, a pusher operable in timed relationship to said cutoff device to axially advance a slug through said cutoff device and cutter box a predetermined distance which determines the thickness of said slices, said apparatus producing a finished special cut brick each time said cutoff device cycles.

8. An apparatus as set forth in claim 7, wherein adjustable guide means engage opposite sides of said slug as it passes said cutoff device and cause scrap to be positioned against said core to support said core against distortion during cutting.

9. An apparatus as set forth in claim 8, wherein sensing means determine the location of the forward end of an initial slug and cause a first squaring cut of the end of said slug, said pusher thereafter operating with stepwise movement through a distance equal to the required thickness of said brick.

* * * * *